(12) United States Patent
Terada et al.

(10) Patent No.: US 8,038,828 B2
(45) Date of Patent: Oct. 18, 2011

(54) PROCESS FOR LASER WELDING RESINOUS MEMBERS, APPARATUS FOR THE SAME AND LASER-WELDED RESINOUS PRODUCT

(75) Inventors: Masaki Terada, Toyota (JP); Akihiko Tsuboi, Chiryu (JP); Seijirou Soeda, Chiryu (JP); Jun Hayakawa, Fukui-ken (JP); Kyouji Kokufuda, Yokohama (JP); Tsuyoshi Tanigaki, Kariya (JP)

(73) Assignees: Toyota Jidosha Kabushiki Kaisha, Toyota-shi, Aichi-ken (JP); Fine Device Co., Ltd., Sakai-Gun, Fukui-ken (JP); Laser X Company, Ltd., Chiryu-shi, Aichi (JP)

( * ) Notice: Subject to any disclaimer, the term of this patent is extended or adjusted under 35 U.S.C. 154(b) by 200 days.

(21) Appl. No.: 12/379,301

(22) Filed: Feb. 18, 2009

(65) Prior Publication Data

US 2009/0211700 A1 Aug. 27, 2009

Related U.S. Application Data

(62) Division of application No. 10/862,436, filed on Jun. 8, 2004, now Pat. No. 7,510,620.

(30) Foreign Application Priority Data

Jun. 11, 2003 (JP) .................................. 2003-166478

(51) Int. Cl.
*B29C 65/16* (2006.01)
(52) U.S. Cl. .................... 156/272.8; 156/60; 156/349
(58) Field of Classification Search ............... 156/272.8, 156/272.2, 60, 349; 219/121.63
See application file for complete search history.

(56) References Cited

U.S. PATENT DOCUMENTS

| | | | |
|---|---|---|---|
| 5,879,416 A | * | 3/1999 | Nakamura et al. ........... 29/623.2 |
| 6,177,648 B1 | | 1/2001 | Lawson et al. |
| 6,193,833 B1 | * | 2/2001 | Gizowski et al. .......... 156/272.8 |
| 6,203,861 B1 | * | 3/2001 | Kar et al. ..................... 427/554 |
| 6,818,857 B1 | * | 11/2004 | Cho et al. ................. 219/121.64 |
| 6,841,024 B2 | | 1/2005 | Drummond et al. |

FOREIGN PATENT DOCUMENTS

| | | | |
|---|---|---|---|
| JP | 57198625 A | * | 12/1982 |
| JP | 11-348132 | | 12/1999 |
| JP | 2001-198982 | | 7/2001 |
| JP | 2001-246488 | | 9/2001 |
| JP | 2001-277364 | | 10/2001 |
| JP | 2002-248688 | | 9/2002 |
| JP | 2004-261986 | | 9/2004 |

OTHER PUBLICATIONS

JP 57198625 English Abstract.*

* cited by examiner

*Primary Examiner* — Richard Crispino
*Assistant Examiner* — Elizabeth Royston
(74) *Attorney, Agent, or Firm* — Finnegan, Henderson, Farabow, Garrett & Dunner, LLP

(57) ABSTRACT

A process is for laser-welding resinous members, and includes the steps of overlapping a transparent resinous member on an absorptive resinous material, and irradiating the transparent resinous member with a laser beam, thereby welding an interface between the transparent resinous member and the absorptive resinous member as a strip shape, wherein the energy of the laser beam acting on a side of a major-curvature-radius curved part of the strip-shaped welded interface and the energy of the laser beam acting on a side of a minor-curvature-radius curved part thereof are averaged.

3 Claims, 7 Drawing Sheets

PROCESS FOR LASER WELDING RESINOUS MEMBERS, APPARATUS FOR THE SAME AND LASER-WELDED RESINOUS PRODUCT

This is a division of application Ser. No. 10/862,436, filed Jun. 8, 2004, now U.S. Pat. No. 7,510,620, which is incorporated herein by reference.

BACKGROUND OF THE INVENTION

1. Field of the Invention

The present invention relates to a process for laser welding resinous members, an apparatus for the same, and a laser-welded resinous product. More specifically, it relates to a process for integrally bonding transparent resinous members exhibiting transmissivity to laser beams and absorptive resinous members exhibiting absorptivity to laser beams by laser welding, an apparatus for the same, and the resulting laser-welded resinous products.

2. Description of the Related Art

Recently, from the viewpoint of weight saving and cost reduction, it has been carried out extensively to resinify component parts of various fields, such as automobile component parts, thereby making them into resinous molded products. Moreover, from the perspective of producing resinous molded products with high productivity, it is often the case to employ the following measures. A resinous molded product is molded as a plurality of the component parts separately in advance. Then, the resulting independent component parts are bonded with each other.

Laser welding processes have been utilized conventionally in order to bond a resin with another resin. For example, Japanese Unexamined Patent Publication (KOKAI) No. 11-348,132 discloses a laser welding process. In the conventional laser welding process, a transparent resinous member exhibiting transmissivity to a laser beam is overlapped on an absorptive resinous member exhibiting to absorptivity to the laser beam. Thereafter, the transparent resinous member is irradiated with the laser beam. Thus, the transparent resinous member and absorptive resinous member are heated to melt at the surfaces, thereby bonding them integrally.

In the conventional laser welding process, the laser beam is absorbed at the interface of the absorptive resinous member when it transmits through the transparent resinous member and reaches the interface. The laser beam absorbed at the interface is accumulated as energy. As a result, the interface of the absorptive resinous member is heated to melt, and simultaneously the interface of the transparent resinous member is heated to melt by the heat transfer from the interface of the absorptive resinous member. When the interface of the transparent resinous member and the interface of the absorptive resinous member are applied to each other under the circumstance, it is possible to bond them integrally.

However, it is not necessarily possible to obtain a uniform welded state by the above-described conventional laser welding process in certain cases. Let us consider the case of welding a resinous product, a box-shaped container, by the conventional laser welding process with reference to FIG. 18. For instance, a box 4 has an opening molded from an absorptive resin, and is welded to a cover 3 composed of a transparent resin. The box 4 and cover 3 are welded by using a laser beam 1 along a weld line 2 to complete a welded product 5. When scanning the linear parts of the weld line 2 with the laser beam 1 to weld thereat, the laser energy per unit time is constant on the surface 4' of the box 4 under the conditions that the laser power, the scanning speed and the thickness of the cover 3 are constant. Accordingly, it is possible to weld uniformly in the longitudinal direction and widthwise direction of the weld line 2 in welding at the interface between the cover 3 and the box 4. However, the laser beam 1 has a finite irradiation cross-sectional area. Consequently, it is not necessarily possible to weld uniformly at the curved parts 2' of the weld line 2 (i.e., parts adjacent to the corners of the welded product 5) at which the scanning direction of the laser beam 1 is changed from one direction to another.

Moreover, FIG. 17 illustrates a relationship between a welding line 2 and a laser-beam spot 3 adjacent to a corner of the welding line 2 when a laser beam has an ellipse cross section and a spot diameter equal to the width of the weld line 2. Under the condition that the scanning speed of the laser beam is constant, the travel distance of the laser beam along the left-hand side tangent "A" of the laser-beam spot 3 forming the weld line 2 is equal to the travel distance of the right-side tangent "B" thereof at the linear parts of the weld line 2; but the travel distance of the laser beam along the major-curvature-radius curved part $R_2$ (or along the outermost peripheral line "A") is longer than the travel distance of the laser beam along the minor-curvature-radius curved part $R_1$ (or along the innermost peripheral line "B") at the curved part of the weld line 2. This implies that, when the energy of the laser beam irradiating per unit time is equalized at the locus 1 of the center of the laser spot 3 (shown with the alternate long and short dash line of the drawing), the energy is insufficient at the outermost peripheral line "A"; but it is excessive at the innermost peripheral line "B." Thus, the energy density has become higher at the minor-curvature-radius curved part $R_1$ than at the major-curvature-radius curved part $R_2$ in the curved part of the weld line 2. As a result, the curved part of the welding line 2 is inferior to the linear parts thereof in terms of the weld strength. Moreover, the weld might be insufficient at the major-curvature-radius curved part $R_2$, and the constituent resin might be degraded at the minor-curvature-radius curved part $R_1$ because of the excessive energy.

SUMMARY OF THE INVENTION

The present invention has been developed in view of such circumstances. It is therefore an object of the present invention to provide a process for welding a transparent resinous member exhibiting transmissivity to a laser beam to an absorptive resinous member exhibiting absorptivity to the laser beam, process which can equalize the weld strength in the widthwise direction of the weld line at the curved parts thereof. It is a further object of the present invention to provide a welding apparatus for the same. It is a furthermore object of the present invention to provide a laser-welded resinous product in which the weld strength is equalized at the corners.

In order to solve the aforementioned problems, a process for laser welding resinous members according to a first aspect of the present invention comprises the steps of:

overlapping a transparent resinous member on an absorptive resinous material, the transparent resinous member having a first predetermined shape, and comprising a part including a strip-shaped first weld surface, at least the part formed of a transparent resin allowing a laser beam to transmit therein, the absorptive resinous member having a second predetermined shape, and comprising a part including a strip-shaped second weld surface to be welded to the first weld surface, at least the part formed of an absorptive resin which absorbs the laser beam; and irradiating the transparent resinous member with the laser beam, thereby welding an interface between the first weld surface of the transparent resinous member and the second weld surface of the absorptive resinous member as a strip shape, the interface having a weld line welded as a strip shape and comprising linear parts neighboring with each other, a major-curvature-radius curved part intervening between the linear parts and a minor-curvature-radius curved part intervening between the linear parts, wherein energy averaging means averages the energy of the laser beam acting on a side of the major-curvature-radius curved part and the energy of the laser beam acting on a side of the minor-curvature-radius curved part in the second weld surface of the absorptive resinous member.

In the process according to a second aspect of the present invention, the energy averaging means makes a thickness of the major-curvature-radius curved part thinner than that of the minor-curvature-radius curved part in the transparent resinous member.

In the process according to a third aspect of the present invention, the energy averaging means lets the laser beam traverse along a scanning line shifted on a side of the major-curvature-radius curved part with respect to the center line of a strip-shaped width of the weld line.

In the process according to a fourth aspect of the present invention, the energy averaging means functions as an energy-density controlling means for controlling an energy density of the laser beam acting on the major-curvature-radius curved part so as to be relatively greater than an energy density of the laser beam acting on the linear parts or the minor-curvature-radius curved part.

In the process according to a fifth aspect of the present invention, the energy-density controlling means comprises a transparent or reflective liquid crystal device disposed in a path of the laser beam.

In the process according to a sixth aspect of the present invention, the energy-density controlling means comprises a reflector plate disposed in a path of the laser beam, and composed of a plurality of minute mirrors controlled electrically.

In the process according to a seventh aspect of the present invention, the energy-density controlling means a rotary disk disposed in a path of the laser beam, and having a plurality of apertures through which the laser beam passes.

In the process according to an eighth aspect of the present invention, the energy-density controlling means comprises a cylindrical lens disposed in a path of the laser beam, and having an eccentric focus.

In the process according to a ninth aspect of the present invention, the energy-density controlling means gives at least one stress selected from the group consisting of flexural stress, tensile stress and compression stress to an optical fiber for transmitting the laser beam.

In the process according to a tenth aspect of the present invention, the laser beam is emitted from at least one member selected from the group consisting of YAG lasers, laser diodes and fiber lasers.

In the process according to an eleventh aspect of the present invention, the energy-density controlling means comprises a plurality of small-sized oscillators, and a plurality of bundled optical fibers connected with the small-sized oscillators, and controls laser beams emitted from the bundled optical fibers by controlling the small-sized oscillators individually.

In the process according to a twelfth aspect of the present invention, the energy averaging means lets the laser beam exhibit a cross-sectional energy-density distribution which is axially symmetrical to a scanning direction of the laser beam at the linear parts of the weld line, and swings the laser beam about the axial line of the laser beam synchronously with the scanning with the laser beam at the major-curvature-radius curved part and minor-curvature-radius curved part of the weld line, thereby lowering an energy density at the minor-curvature-radius curved part than that at the major-curvature-radius curved part. Moreover, in the process according to a thirteenth aspect of the present invention, the energy averaging means lets the laser beam rotate about the axial line of the laser beam by rotating a cylindrical lens or a polarization plate at the linear parts of the weld line, and lets the laser beam swing about the axial line of the laser beam by swinging the cylindrical lens or the polarization plate at the major-curvature-radius curved part and minor-curvature-radius curved part of the weld line.

In the process according to a fourteenth aspect of the present invention, the energy averaging means equalizes an energy density of the laser beam at the linear parts of the weld line by rotating the laser beam about the axial line of the laser beam at a high revolving speed, and turns off the high-revolving-speed rotation of the laser beam temporarily at the major-curvature-radius curved part and minor-curvature-radius curved part of the weld line so as to swing the laser beam about the axial line of the laser beam synchronously with the scanning with the laser beam, thereby lowering an energy density at the minor-curvature-radius curved part than that at the major-curvature-radius curved part. Moreover, in the process according to a fifteenth aspect of the present invention, the energy averaging means lets the laser beam rotate about the axial line of the laser beam by rotating a cylindrical lens or a polarization plate at the linear parts of the weld line, and lets the laser beam swing about the axial line of the laser beam by swinging the cylindrical lens or the polarization plate at the major-curvature-radius curved part and minor-curvature-radius curved part of the weld line.

In the process according to a sixteenth aspect of the present invention, the energy-density controlling means emits a laser beam whose diameter is fully smaller than a strip-shaped width of the weld line.

In the process according to a seventeenth aspect of the present invention, the weld line is scanned with the small-diameter laser beam while vibrating the small-diameter laser beam in a widthwise direction of the weld line.

In the process according to an eighteenth aspect of the present invention, the weld line is scanned with the small-diameter laser beam a plurality of times by traversing the small-diameter laser beam spirally within the weld line.

In the process according to a nineteenth aspect of the present invention, the weld line is scanned with the small-diameter laser beam a plurality of times by traversing the smaller-diameter laser beam parallely within the weld line.

In the process according to a twentieth aspect of the present invention, the energy averaging means lets the laser beam scan the linear parts of the weld line only, thereby making the weld line free from the major-curvature-radius curved part and the minor-curvature-radius curved part.

A laser welding apparatus according to a twenty-first aspect of the present invention comprises:

means for irradiating a transparent resinous member overlapped on an absorptive resinous member with a laser beam,
the transparent resinous member having a first predetermined shape, and comprising a part including a strip-shaped first weld surface, at least the part formed of a transparent resin allowing the laser beam to transmit therein, the absorptive resinous member having a second predetermined shape, and comprising a part including a strip-shaped second weld surface to be welded to the first weld surface, at least the part formed of an absorptive resin which absorbs the laser beam;

whereby welding an interface between the first weld surface of the transparent resinous member and the second weld surface of the absorptive resinous member as a strip shape, the interface having a weld line welded as a strip shape and comprising linear parts neighboring with each other, a major-curvature-radius curved part intervening between the linear parts and a minor-curvature-radius curved part intervening between the linear parts; and energy averaging means for averaging the energy of the laser beam acting on a side of the major-curvature-radius curved part and the energy of the laser beam acting on a side of the minor-curvature-radius curved part in the second weld surface of the absorptive resinous member.

A laser-welded resinous product according to a twenty-second aspect of the present invention comprises:

a transparent resinous member having a first predetermined shape, and comprising a part including a strip-shaped first weld surface, at least the part formed of a transparent resin allowing a laser beam to transmit therein;

an absorptive resinous member overlapped on the transparent resinous member, having a second predetermined shape, and comprising a part including a strip-shaped second weld surface to be welded to the first weld surface, at least the part formed of an absorptive resin which absorbs the laser beam;

the transparent resinous member and the absorptive resinous member being welded at an interface between the first weld surface of the transparent resinous member and the second weld surface of the absorptive resinous member as a strip shape by irradiating the transparent resinous member with the laser beam, the interface having a weld line welded as a strip shape and comprising linear parts neighboring with each other, a major-curvature-radius curved part intervening between the linear parts and a minor-curvature-radius curved part intervening between the linear parts; and exhibiting weld strength on a side of the major-curvature-radius curved part substantially equal to weld strength on a side of the minor-curvature-radius curved part.

In the process according to the first aspect of the present invention, the weld line at which the transparent resinous member and the absorptive resinous member are welded as a strip shape comprises the linear parts neighboring with each other, the major-curvature-radius curved part intervening between the linear parts and the minor-curvature-radius curved part intervening between the linear parts; and the energy averaging means averages the energy of the laser beam acting on a side of the major-curvature-radius curved part and the energy of the laser beam acting on a side of the minor-curvature-radius curved part in the second weld surface of the absorptive resinous member. Therefore, it is possible to equalize the weld strength at the major-curvature-radius curved part of the weld line with the weld strength at the minor-curvature-radius curved part thereof.

As described above, the process according to the first aspect of the present invention can equalize the weld strength at the corners of the weld line, composed of the linear parts, the major-curvature-radius curved part and the minor-curvature-radius curved part, in the widthwise direction thereof when welding the overlapped transparent resinous member and absorptive resinous member by the laser beam. Therefore, it is possible to appropriately apply the process according to the first aspect of the invention to welding resinous products, such as cases for in-vehicle computers, hybrid inverter cases and lamp cases having corners, which are required to be highly airtight.

In the process according to the second aspect of the present invention, the energy averaging means makes a thickness of the major-curvature-radius curved part thinner that of the minor-curvature-radius curved part in the transparent resinous member. Accordingly, it is possible to irradiate the major-curvature-radius curved part as well with the laser beam of sufficient energy. Consequently, it is possible to equalize the weld strength at the major-curvature-radius curved part of the weld line with the weld strength at the minor-curvature-radius curved part thereof.

In the process according to the third aspect of the present invention, the energy averaging means lets the laser beam scan along a scanning line shifted on a side of the major-curvature-radius curved part with respect to the center line of a strip-shaped width of the weld line. Accordingly, it is possible to irradiate the major-curvature-radius curved part as well with the laser beam of sufficient energy. Consequently, it is possible to equalize the weld strength at the major-curvature-radius curved part of the weld line with the weld strength at the minor-curvature-radius curved part thereof.

In the process according to the fourth aspect of the present invention, the energy averaging means functions as an energy-density controlling means for controlling an energy density of the laser beam acting on the major-curvature-radius curved part so as to be relatively greater than an energy density of the laser beam acting on the linear parts or the minor-curvature-radius curved part. Accordingly, it is possible to cause an energy-density deviation in the cross section of the laser beam. That is, it is possible to place the higher-energy-density side of the laser beam on a side of the major-curvature-radius curved part of the weld line, and to place the lower-energy-density side of the laser beam on a side of the minor-curvature-radius curved part thereof. Therefore, it is possible to equalize the weld strength in the widthwise direction of the weld line at the corners.

In the process according to the fifth aspect of the present invention, the energy-density controlling means comprises a transparent or reflective liquid crystal device disposed in a path of the laser beam. Therefore, it is possible to cause an energy-density deviation in the cross section of the laser beam.

In the process according to the sixth aspect of the present invention, the energy-density controlling means comprises a reflector plate disposed in a path of the laser beam, and composed of a plurality of minute mirrors controlled electrically. Therefore, it is possible to cause an energy-density deviation in the cross section of the laser beam.

In the process according to the seventh aspect of the present invention, the energy-density controlling means comprises a rotary disk disposed in a path of the laser beam, and having a plurality of apertures through which the laser beam passes. Therefore, it is possible to cause an energy-density deviation in the cross section of the laser beam.

In the process according to the eighth aspect of the present invention, the energy-density controlling means comprises a cylindrical lens disposed in a path of the laser beam, and having an eccentric focus. Therefore, it is possible to cause an energy-density deviation in the cross section of the laser beam.

In the process according to the ninth aspect of the present invention, the energy-density controlling means gives at least one stress selected from the group consisting of flexural stress, tensile stress and compression stress to an optical fiber for transmitting the laser beam. Therefore, it is possible to cause an energy-density deviation in the cross section of the laser beam.

In the process according to the tenth aspect of the present invention, the laser beam is emitted from at least one member selected from the group consisting of YAG lasers, laser diodes and fiber lasers. Therefore, it is possible to apply desirable stress to the optical fiber.

In the process according to the eleventh aspect of the present invention, the energy-density controlling means comprises a plurality of small-sized oscillators, and a plurality of bundled optical fibers connected with the small-sized oscillators, and controls laser beams emitted from the bundled optical fibers by controlling the small-sized oscillators individually. Therefore, it is possible to cause an energy-density deviation in the cross section of the resulting bundled laser beams.

In the process according to the twelfth aspect of the present invention, the energy averaging means lets the laser beam exhibit a cross-sectional energy-density distribution (or deviation) which is axially symmetrical to a scanning direction of the laser beam at the linear parts of the weld line, and swings the laser beam about the axial line of the laser beam synchronously with the scanning with the laser beam at the major-curvature-radius curved part and minor-curvature-radius curved part of the weld line, thereby lowering an energy density at the minor-curvature-radius curved part than that at the major-curvature-radius curved part. Accordingly, it is possible to equalize the weld strength in the widthwise direction of the weld line at the corners. Moreover, in the process according to the thirteenth aspect of the present invention, the energy averaging means lets the laser beam rotate about the axial line of the laser beam by rotating a cylindrical lens or a polarization plate at the linear parts of the weld line, and lets the laser beam swing about the axial line of the laser beam by swinging the cylindrical lens or the polarization plate at the major-curvature-radius curved part and minor-curvature-radius curved part of the weld line. Consequently, it is possible to rotate the laser beam about the axial line of the laser beam synchronously with the rotation of the cylindrical lens or polarization plate at the linear parts of the weld line, and to swing the laser beam about the axial line of the laser beam synchronously with the swing of the cylindrical lens or polarization plate at the major-curvature-radius curved part and minor-curvature-radius curved part of the weld line.

In the process according to the fourteenth aspect of the present invention, the energy averaging means equalizes an energy density of the laser beam at the linear parts of the weld line by rotating the laser beam about the axial line of the laser beam at a high revolving speed, and turns off the high-revolving-speed rotation of the laser beam temporarily at the major-curvature-radius curved part and minor-curvature-radius curved part of the weld line so as to swing the laser beam about the axial line of the laser beam synchronously with the scanning with the laser beam, thereby lowering an energy density at the minor-curvature-radius curved part than that at the major-curvature-radius curved part. Accordingly, it is possible to equalize the weld strength in the widthwise direction of the weld line at the corners. Moreover, in the process according to the fifteenth aspect of the present invention, the energy averaging means lets the laser beam rotate about the axial line of the laser beam by rotating a cylindrical lens or a polarization plate at the linear parts of the weld line, and lets the laser beam swing about the axial line of the laser beam by swinging the cylindrical lens or the polarization plate at the major-curvature-radius curved part and minor-curvature-radius curved part of the weld line. Consequently, it is possible to rotate the laser beam about the axial line of the laser beam synchronously with the rotation of the cylindrical lens or polarization plate at the linear parts of the weld line, and to swing the laser beam about the axial line of the laser beam synchronously with the swing of the cylindrical lens or polarization plate at the major-curvature-radius curved part and minor-curvature-radius curved part of the weld line.

In the process according to the sixteenth aspect of the present invention, the energy averaging means emits a laser beam whose diameter is fully smaller than a strip-shaped width of the weld line. Therefore, it is possible to equalize the weld strength in the widthwise direction of the weld line at the corners.

In the process according to the seventeenth aspect of the present invention, the weld line is scanned with the small-diameter laser beam while vibrating the small-diameter laser beam in a widthwise direction of the weld line. Therefore, it is possible to equalize the weld strength in the widthwise direction of the weld line at the corners.

In the process according to the eighteenth aspect of the present invention, the weld line is scanned with the small-diameter laser beam a plurality of times by traversing the small-diameter laser beam spirally within the weld line. Therefore, it is possible to equalize the weld strength in the widthwise direction of the weld line at the corners.

In the process according to the nineteenth aspect of the present invention, the weld line is scanned with the small-diameter laser beam a plurality of times by traversing the smaller-diameter laser beam parallely within the weld line. Therefore, it is possible to equalize the weld strength in the widthwise direction of the weld line at the corners.

In the process according to the twentieth aspect of the present invention, the energy averaging means lets the laser beam scan the linear parts of the weld line only, thereby making the weld line free from the major-curvature-radius curved part and the minor-curvature-radius curved part. Therefore, it is possible to equalize the weld strength at all locations in the weld line.

In the laser-welding apparatus according to the twenty-first aspect of the present invention, the irradiating means laser welds the transparent resinous member and the absorptive resinous member as a strip shape so that the weld line comprises the linear parts neighboring with each other, the major-curvature-radius curved part intervening between the linear parts and the minor-curvature-radius curved part intervening between the linear parts; and the energy averaging means averages the energy of the laser beam acting on a side of the major-curvature-radius curved part and the energy of the laser beam acting on a side of the minor-curvature-radius curved part in the second weld surface of the absorptive resinous member. Therefore, it is possible to equalize the weld strength at the major-curvature-radius curved part of the weld line with the weld strength at the minor-curvature-radius curved part thereof.

In the production of the laser-welded resinous product according to the twenty-second aspect of the present invention, the energy of the laser beam acting on the major-curvature-radius curved part and the energy of the laser beam acting on the minor-curvature-radius curved part are averaged in the second weld surface of the absorptive resinous member by the energy averaging means according to the present laser welding process or laser welding apparatus. Therefore, the laser-weld resinous product is provided with the major-curvature-radius curved part whose weld strength is equalized with that of the minor-curvature-radius curved part substantially.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Laser Welding Process

A process according to the present invention is for laser welding resinous members, and comprises the steps of:

overlapping a transparent resinous member on an absorptive resinous material, the transparent resinous member having a first predetermined shape, and comprising a part including a strip-shaped first weld surface, at least the part formed of a transparent resin allowing a laser beam to transmit therein, the absorptive resinous member having a second predetermined shape, and comprising a part including a strip-shaped second weld surface to be welded to the first weld surface, at least the part formed of an absorptive resin which absorbs the laser beam; and irradiating the transparent resinous member with the laser beam, thereby welding an interface between the first weld surface of the transparent resinous member and the second weld surface of the absorptive resinous member as a strip shape, the interface having a weld line welded as a strip shape and comprising linear parts neighboring with each other, a major-curvature-radius curved part intervening between the linear parts and a minor-curvature-radius curved part intervening between the linear parts, wherein energy averaging means averages the energy of the laser beam acting on a side of the major-curvature-radius curved part and the energy of the laser beam acting on a side of the minor-curvature-radius curved part in the second weld surface of the absorptive resinous member.

In the present laser-welding process, it is possible to name the following as the means for averaging the energy of the laser beam:

(1) controlling the thickness of the transparent resinous member;

(2) controlling the locus of scanning with the laser beam;

(3) varying the way of scanning the linear parts of the weld line with that of scanning the curved parts thereof by controlling the energy density in the cross section of the laser beam;

(4) irradiating the strip-shaped weld line with a small-diameter laser beam so as to mark it out; and (5) making the weld line of linear parts only.

These means will be hereinafter described in detail with reference to the drawings.

(1) Controlling Thickness of Transparent Resinous Member

Figure 1:
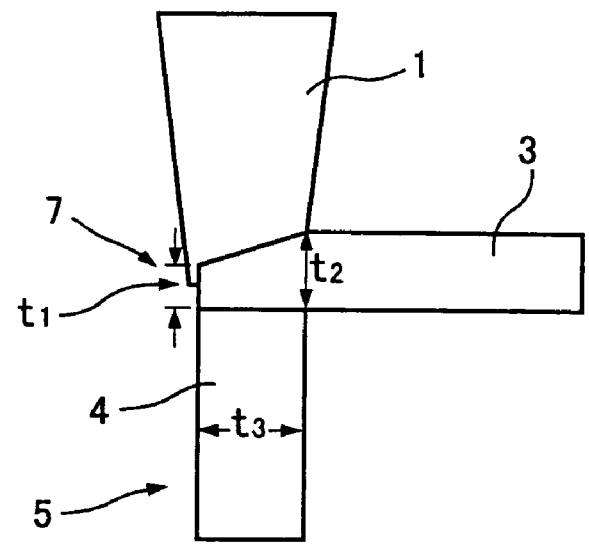
FIG. 1 is a schematic diagram for illustrating a positional relationship between a laser beam and a transparent resinous member whose thickness is corrected at a curved part of a weld line.

In the present laser welding process, a transparent resinous member in which a laser beam transmits is overlapped on an absorptive resinous member which absorbs the laser beam; and the transparent resinous member is irradiated with the laser beam to melt the surface of the absorptive resinous member by generating heat, thereby welding the transparent resinous member and the absorptive resinous member together. Therefore, the absorptive resinous member absorbs most of the energy of the laser beam, but the transparent resinous member absorbs a part thereof as well. The absorption not only depends on the type of resins making the transparent resinous member and absorptive resinous member, but also on the laser-beam transmission length in the transparent resinous member, that is, the thickness of the transparent resinous member. The above-described disadvantageous phenomenon, the energy of the laser beam being less at the major-curvature-radius curved part of a weld line than at the minor-curvature-radius curved part thereof, occurs when the thickness of the transparent resinous member is constant (i.e., the energy of the laser beam which transmits through the transparent resinous member and reaches the absorptive resinous member is constant). Accordingly, as illustrated in FIG. 1, the thickness of a transparent resinous member 3 is thinned on the major-curvature-radius side at which the laser-beam energy density lowers, and is thickened on a minor-curvature-radius side at which the laser-beam energy heightens, thereby averaging the energy intensity of the laser beam reaching the second weld surface or interface of an absorptive resinous member 4. Note that FIG. 1 is a schematic cross-sectional diagram of a curved part 7 of a weld line in a laser-welded resinous product 5 in which the transparent resinous member 3 and the absorptive resinous member 4 are welded together by irradiating the transparent resinous member 3 with a laser beam 1. Thus, as illustrated in the drawing, a thickness $t_1$ on the major-curvature-radius side of the transparent resinous member 3 is made thinner than a thickness $t_2$ on the minor-curvature-radius side thereof.

The thickness $t_1$ on the major-curvature-radius side of the transparent resinous member 3, and the thickness $t_2$ on the minor-curvature-radius side thereof will be hereinafter calculated. Note that the thickness $t_1$ and thickness $t_2$ allow to equalize the molten state on the major-curvature-radius side in the interface of the absorptive resinous member 4 with that on the minor-curvature-radius side therein.

Figure 20:
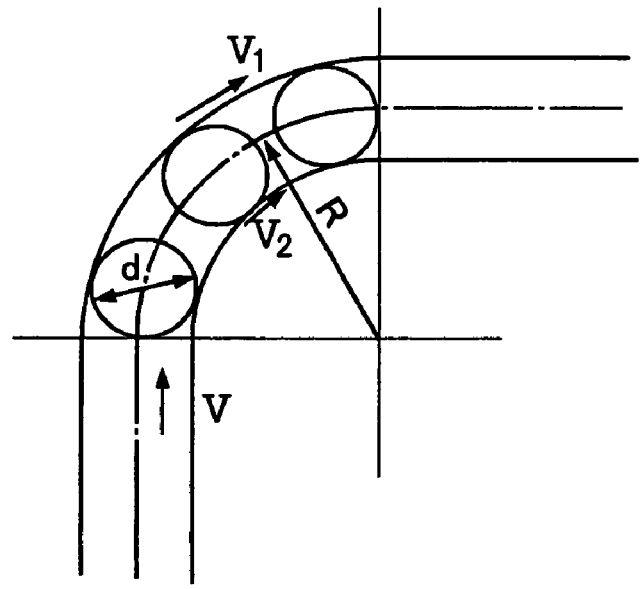
FIG. 20 is a schematic diagram for illustrating how a laser beam travels along a curved part of a strip-shaped weld line.

FIG. 20 illustrates how a laser beam travels along a curved part of a strip-shaped weld line. Note that let "d" be a spot diameter of the laser beam (mm); "V" be a traveling speed of the laser beam (mm/sec) along the linear parts of the weld line and the center line between the curved parts thereof; "$V_1$" be a traveling speed of the laser beam (mm/sec) along the major-curvature-radius curved part of the weld line; "$V_2$" be a traveling speed of the laser beam (mm/sec) along the minor-curvature-radius curved part of the weld line; "A" be an energy density of the laser beam (W/mm²); "R" be a curvature radius of a locus of the center of the laser beam (mm); "K" be a first transmission coefficient, a constant depending on transparent resinous materials; and "a" be a second transmission constant, another constant depending on transparent resinous materials, "$A_T$," an energy density of the laser beam which transmits through a thickness "t" can be expressed by the following equation (a).

$$A_T = K \times \{\exp^{-1}(\alpha t)\} \times A \qquad (a)$$

Therefore, "$A_{T1}$" an energy density of the laser beam which transmits through a thickness "$t_1$" can be expressed by the following equation (b).

$$A_{T1} = K \times \{\exp^{-1}(\alpha t_1)\} \times A \qquad (b)$$

Likewise, "$A_{T2}$," an energy density of the laser beam which transmits through a thickness "$t_2$" can be expressed by the following equation (c).

$$A_{T2} = K \times \{\exp^{-1}(\alpha t_2)\} \times A \qquad (c)$$

Moreover, "T," a time (sec) required for the laser beam to travel along the curved part of the weld can be expressed by the following equation (d). Accordingly, "ΔE," an energy (J/mm²) acquired by a minute segment of the curved part of the weld line along the locus of the center of the laser beam can be expressed by the following equation (e).

$$T = \{(2\pi R/4)/V\} = \pi R/2V \qquad (d)$$

$$\Delta E = A_T \times T = K \times \{\exp^{-1}(\alpha t)\} \times A \times (1/V) \qquad (e)$$

Similarly, "$\Delta E_1$," an energy (J/mm²) acquired by a minute segment of the major-curvature-radius curved part of the weld line, and "$\Delta E_2$," an energy (J/mm²) acquired by a minute segment of the minor-curvature-radius curved part thereof can be expressed by the following equations (f) and (g), respectively.

$$\Delta E_1 = K \times \{\exp^{-1}(\alpha t_1)\} \times A \times [R/\{R_1 + (d/2)\}] \times (1/V_1) \qquad (f)$$

$$\Delta E_2 = K \times \{\exp^{-1}(\alpha t_2)\} \times A \times [R_1/\{R_2 - (d/2)\}] \times (1/V_2) \qquad (g)$$

In order to establish an equally molten state on the major-curvature-radius curved part and on the minor-curvature-radius curved part, the energy acquired by a minute segment of the major-curvature-radius curved part of the weld line can be equal to the energy acquired by a minute segment of the minor-curvature-radius curved part thereof. Accordingly, the "$t_1$'" and "$t_2$" can be determined so that "$\Delta E_1$"=$\Delta E_2$."

(2) Controlling Locus of Scanning with Laser Beam

Figure 2:
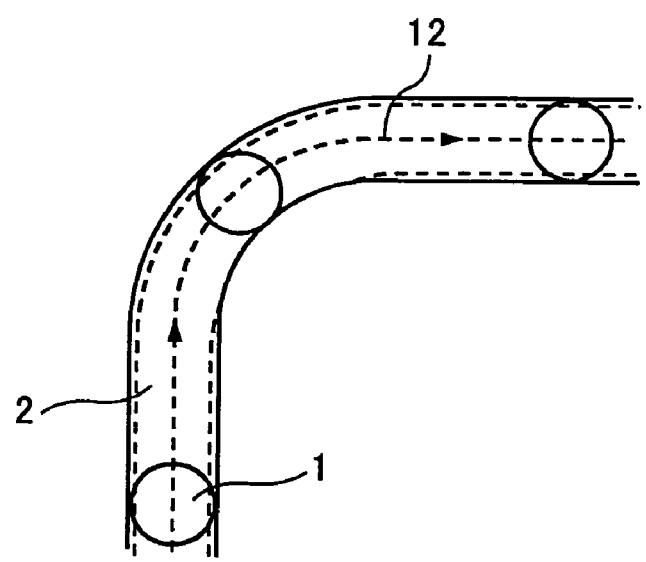
FIG. 2 is a schematic diagram for illustrating a weld-strength assurable range at a curved part of a weld line.
Figure 19:
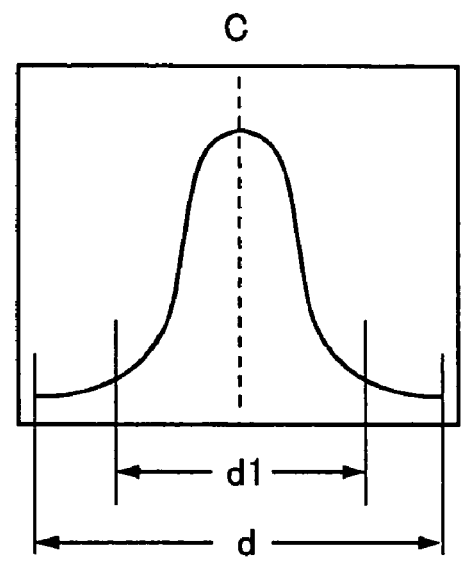
FIG. 19 is a conceptual schematic diagram for illustrating an energy-intensity distribution of a laser beam having a substantially circular cross section.

FIG. 2 illustrates a scanning process in which a beam of laser beam is shifted on a major-curvature-radius side at the curved part of a weld line. It has been known that the energy intensity of a laser beam is not uniform even in the cross section of the laser beam and exhibits a Gaussian distribution as illustrated in FIG. 19 in most of the cases. FIG. 19 is a conceptual schematic diagram for illustrating an energy-intensity distribution of a laser beam having a substantially circular cross section. The horizontal axis designates a radial distance of a laser beam whose center coincides with the axis "C," and the vertical axis designates an energy intensity. As can be understood from the drawing, when the laser beam has a diameter "d," the laser beam exhibits a high energy intensity in a diametric range of "d1" close to the center of the laser beam, but produces only an extremely low energy intensity in the outer periphery, in a diametric range of "d"-"d1."

Figure 3:
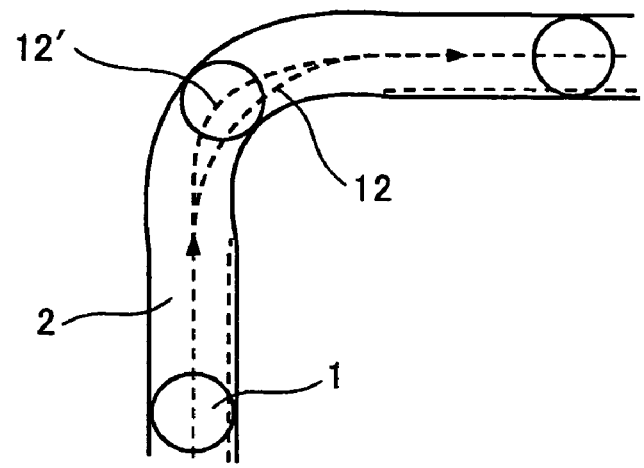
FIG. 3 is a schematic diagram for illustrating a corrected scanning at the curved part of the weld line with a laser beam.

When scanning a weld line 2 with a laser beam 1 having such an energy-intensity distribution so as to coincide the center of the laser beam 1 with the widthwise center of the weld line 2 as illustrated in FIG. 2, a desirable weld strength can be secured at the inside of the weld line 2 between the outer and inner dotted lines of the drawing of the weld line 2, but a desirable weld strength might not be secured in the outer part with respect to the outer dotted line, i.e., in the outer part of the weld line 2 corresponding to the diametric range of "d"-"d1" of the laser beam 1 shown in FIG. 19. Note that, at the linear parts of a weld line, the irradiation energy intensity of a laser beam is axially symmetric with respect to the width of the weld line. However, at the curved parts of the weld line, a sufficient energy can be supplied to a side of the minor-curvature-radius curved part, but, on a side of the major-curvature radius curved part, the range where a desirable weld strength can be secured is shifted inwardly so that the optimum weld range has been narrowed. Therefore, in order to secure a desirable weld strength at the outermost periphery of the curved parts of the weld line 2, it is advisable to scan the curved parts of the weld line 2 while shifting the locus 12 of the center of the scanning laser beam 1 outwardly so as to place it on a scanning line 12' shown in FIG. 3.

3) Varying Way of Scanning Weld-line Linear Parts with that of Scanning Weld-line Curved Parts (3)-1 Controlling Energy Density in Cross Section of Laser Beam As described above, the intensity of a laser beam is not uniform in the cross section of the laser beam. However, the energy-intensity distribution of a laser beam is usually symmetric with respect to the axial line of the laser beam. However, when the energy-intensity distribution of a laser beam is made asymmetric with respect to the axial line of the laser beam in the cross section of the laser beam, and when the energy density of the laser beam is controlled in the cross section of the laser beam so that the energy density is made relatively larger at the major-curvature-radius curved part of a weld line than that at the linear parts or minor-curvature-radius curved part thereof, it is possible to equalize the weld strength at the major-curvature-radius curved part with that at the minor-diameter-curvature curved part thereof.

Figure 4:
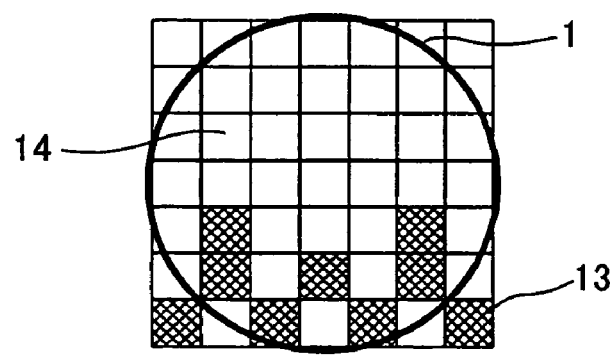
FIG. 4 is a schematic diagram for illustrating a disposition relationship between a liquid crystal device and a laser beam.
Figure 5:
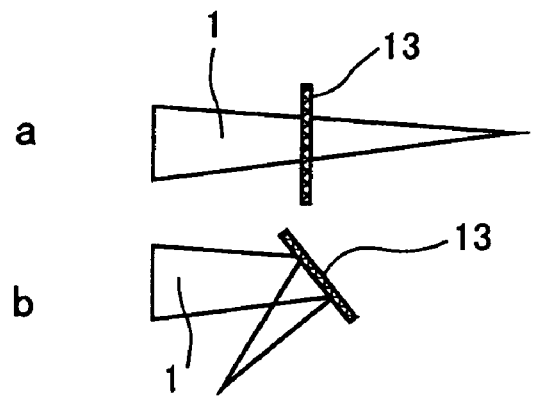
FIG. 5 is a schematic diagram for illustrating a disposition relationship between a liquid crystal device and a laser beam, wherein "a" designates a disposition relationship between a transparent liquid crystal device and a laser beam; and "b" designates a disposition relationship between a reflector plate, comprising a reflective liquid crystal device or minute mirrors, and a laser beam.

As for a method of controlling the energy density of a laser beam, it is possible to dispose a liquid crystal device or reflector mirror in a path of the laser beam. FIG. 4 is a schematic diagram for illustrating a disposition relationship between a liquid crystal device and a laser beam. In the drawing, the square designates a liquid crystal device 13, and the inscribing circle designates a laser beam 1. The liquid crystal 13 comprises fine meshes 14. It is possible to control the energy-density distribution in the cross section of the laser beam 1 by controlling the fine meshes 14 individually. In FIG. 4, when controlling a part of the meshes 14 in the lower half of the liquid crystal device 13 (i.e., the hatched meshes 14) so as not to let the laser beam 1 pass therethrough, a deviation occurs in the energy-density distribution of the laser beam 1 after the laser beam 1 has passed through the liquid crystal device 13 as shown in FIG. 5a so that the energy density lowers in the lower half of the laser beam 1. That is, it is advisable to control all the meshes 14 of the liquid crystal device 13 so as to let the laser beam 1 pass therethrough at the linear parts of a weld line; and to control a part of the meshes 14 so as not to let a part of the laser beam 1 pass therethrough at the curved parts, thereby irradiating the minor-curvature-radius curved part with a part of the laser beam 1 of lower energy density.

Moreover, when using the laser beam 1 by reflecting it as shown in FIG. 5b, a reflective liquid crystal device 13 can be used. Moreover, instead of the reflective liquid crystal device 13, it is desirable to use a reflector plate comprising a plurality of minute mirrors which are controlled electrically, for example, "DMD" produced by TEXAS INSTRUMENTS INC. Since the minute mirrors can be controlled individually in the reflector plate, it is possible to freely control the energy density of the reflected laser beam 1.

Figure 6:
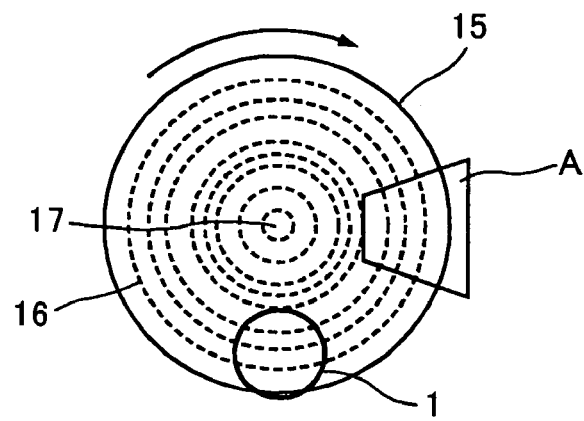
FIG. 6 is a schematic diagram for illustrating a disposition relationship between a rotary disk and a laser beam.
Figure 7:
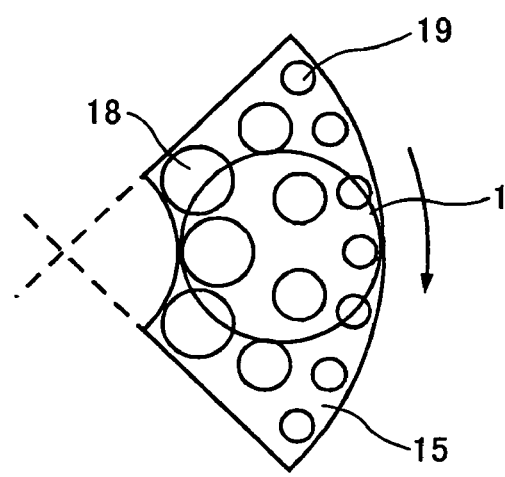
FIG. 7 is an enlarged diagram on a part of the rotary disk illustrated in FIG. 6.

FIG. 6 illustrates a method in which the energy density of a laser beam is controlled by disposing a rotary disk in the path of the laser beam, the rotary disk having apertures through which the laser beam passes. As shown in the drawing, a rotary disk 15 is provided with apertures 16, and is disposed rotatably about its center 17. The laser beam passes through the apertures 16 which are bored concentrically through the rotary disk 15. FIG. 7 shows the portion "A" of FIG. 6 in an enlarged manner, and illustrates an example of an arrangement for disposing the apertures 16. As illustrated in the drawing, major-diameter apertures 18 are disposed concentrically on a central side of the rotary disk 15, and minor-diameter apertures 19 are disposed concentrically on an outer peripheral side thereof. When a laser beam 1 is fixed and the rotary disk 15 is rotated, the laser beam 1 which has passed through the apertures 18 and 19 of the rotary disk 15 can exhibit an energy-density distribution which is higher on an inner peripheral side of the rotary disk 15 and which is lower on an outer peripheral side thereof. Note that it is possible to bore apertures having the same shape through the rotary disk 15 with densities varying in the radial direction of the rotary disk 15. Moreover, when the laser beam 1 is moved in the radial direction of the rotary disk 15, it is possible as well to vary the energy-density distribution of the laser beam 1 which has passed through the apertures 18 and 19 of the rotary disk 15. Therefore, it is possible for a piece of the rotary disk 15 to cope with a plurality of curved parts of weld lines, curved parts which have different curvature radii. Note that materials for the rotary disk 15 are not limited as far as they do not permit laser beams to transmit. For example, it is possible to use metals, such as iron, aluminum and copper, hard-and-brittle materials, such as ceramic and glass.

The above-described liquid crystal devices and rotary disk can be disposed in a part of the laser-beam path. For instance, it is possible to dispose them between an oscillator and a beam expander, or between a beam expander and a galvano-mirror.

Figure 8:
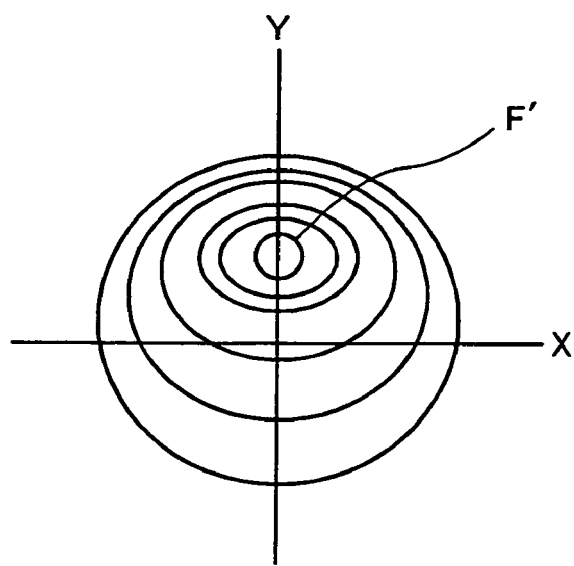
FIG. 8 is a contour map for illustrating an energy intensity distribution of a laser beam when the laser beam is emitted through a lens having an eccentric focus.

As for another method of controlling the energy density of a laser beam, it is possible to use a cylindrical lens which makes the after-control energy-density distribution of the laser beam asymmetric as depicted with a contour map shown in FIG. 8. Specifically, it is possible to use a lens whose center line is asymmetric with respect to the x-axis and linearly symmetric with respect to the y-axis as illustrated schematically in FIG. 9. As shown in the drawing, in the optical system of lasers, a collimator lens 20 turns laser light into a parallel ray of light, and a focusing lens 21 turns it into a high-energy laser beam by condensing it to the focus. The used focusing lens 21 is usually one which is formed symmetrically with respect to the axial line of laser light as illustrated with the dotted line of FIG. 9. Accordingly, laser light is focused to the focus "F," and the energy intensity of the resulting laser beam distributes like a Gaussian distribution which is symmetric with respect to the axial line as illustrated in FIG. 19. However, when a lens 21' shown with the solid line of FIG. 9 and having an eccentric focus "F'" is used instead of the focusing lens 21, laser light is focused to the eccentric focus "F'." Consequently, it is possible to distribute the energy intensity of the resultant laser beam so that the energy-density distribution is asymmetric with respect to the x-axis as illustrated in FIG. 8.

Figure 10:
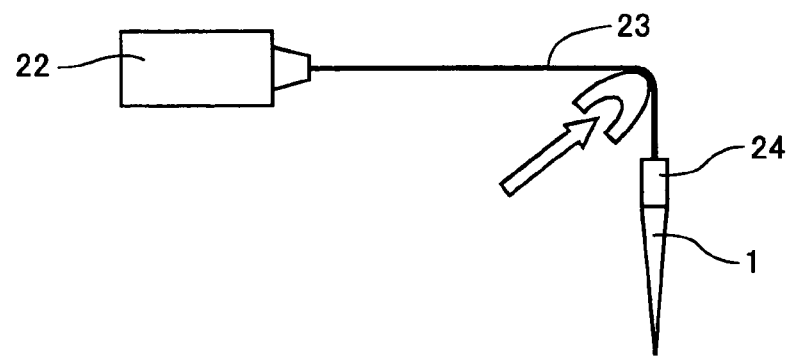
FIG. 10 is a schematic diagram for illustrating how to form an energy-density distribution in a laser beam by giving flexural stress to an optical fiber.

In the case of YAG lasers or semiconductor lasers which use optical fibers for the transmission system, flexural stress, partial compression stress or tensile stress is given to the optical fibers which connect laser-emitting media with a collimator lens, thereby varying the energy-density distribution of laser beams transmitting in the optical fibers. Thus, it is possible to control the energy-density distribution of emitting laser beams. FIG. 10 illustrates an example in which flexural stress is given to a part of an optical fiber. In the drawing, flexural stress is given to a part of an optical fiber 23, which connects a laser oscillator 22 and an optical unit 24 comprising a collimator lens, by appropriate methods. The energy density of the resulting laser beam is the highest on the minor-curvature-radius side of the optical fiber 23, and is the lowest on the major-curvature-radius side thereof. Moreover, it is possible to vary the energy-density distribution of emitting laser beams by changing the flexural curvature radius of optical fibers. However, it is needless to say that it is necessary to take notice that optical fibers should not be flexed to a predetermined curvature radius or less, because the minimum flexural radius of optical fibers is restricted. Even when optical fibers are straight, it is possible to produce a similar effect by partially pressing the outer periphery of optical fibers in the direction of the axial center, or by pulling optical fibers parallely in the axial direction of optical fibers.

Figure 11:
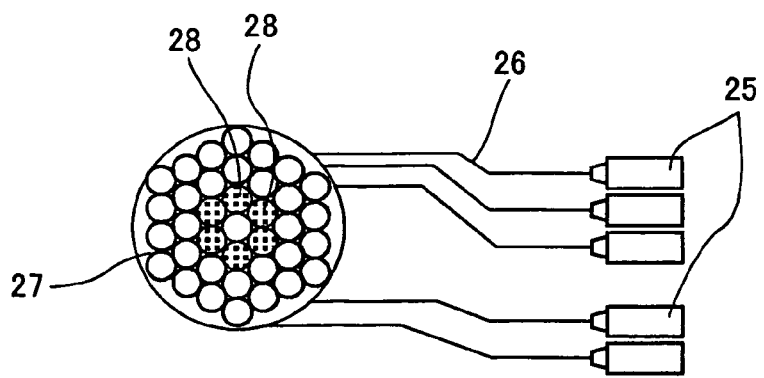
FIG. 11 is a conceptual schematic diagram for illustrating bundled laser beams emitted from a plurality of small-sized oscillators.

It is preferable to use a large number of oscillators, such as light-emitting diodes, which are extremely small and produce laser light with a lesser power, as means for controlling the energy density of a laser beam. For example, in an apparatus which transmits a laser beam by bundling a plurality of fine optical fibers connected with such small-sized oscillators, it is possible to form an energy-density distribution in the bundled laser beams by controlling the output of the individual small-sized oscillators in response to the shape of the curved part of a weld line. FIG. 11 schematically illustrates how to control the energy density of a laser beam by using such small-sized oscillators. In the drawing, a bundled optical fiber is designated at 27, and comprises fine optical fibers 26 connected with a plurality of small-sized oscillators 25 and bundled by a desirable number of pieces. For instance, when the small-sized oscillators 25 are controlled so as to turn off the operation of the small-sized oscillators 25 connected with the fine optical fibers 28 which are depicted with hatching in the cross section of the bundled optical fiber 27, it is possible to emit a laser beam, which has a low energy-density distribution at around the center, from the bundled optical fiber 27. Specifically, it is possible to form an arbitrary deviation in the energy density of a laser beam by controlling the small-sized oscillators 25 properly. Note that, in the manufacture of bundled optical fibers, it is needed that the total output of small-sized oscillators produces a sufficient energy for welding the transparent resinous member to the absorptive resinous member. For example, when carrying out laser welding requiring a laser beam with 300-500 W power by assembled small-sized oscillators with 2-4 W power per unit, it is necessary to assemble the small-sized oscillators in a quantity of from 100 to 200 units.

(3)-2 Scanning with Laser Beam Exhibiting Energy-Density Distribution

So far, methods for forming a deviation in the energy-density distribution in the cross section of a laser beam have been described. When welding the curved parts of a weld line with a laser beam exhibiting such an energy-density distribution, it is advisable to scan a weld line with the laser beam in the following manner.

At the linear parts of the weld line, the weld line is scanned with the laser beam so that the energy-density distribution of the laser beam is axially symmetric with respect to the travelling direction of the laser beam. At the curved parts of the weld line, the laser beam is swung synchronously with the scanning of the weld line so that the energy density of the laser beam is always the lowest at the minor-curvature-radius curved part of the weld line.

Figure 12:
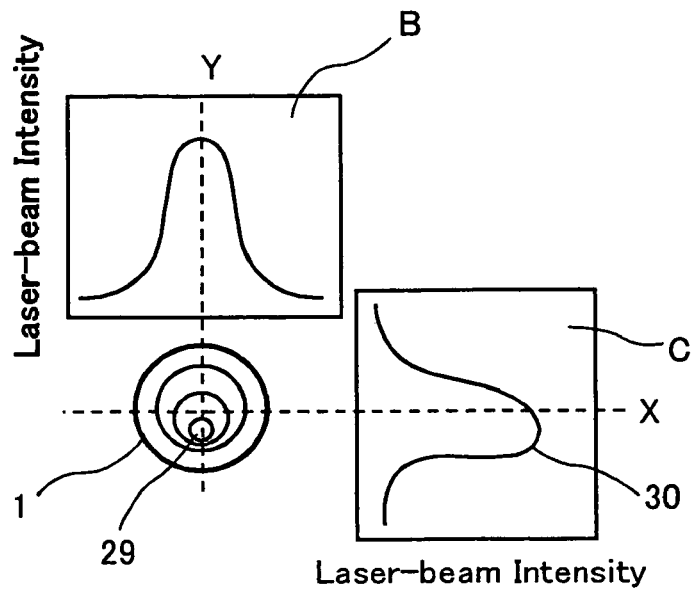
FIG. 12 is a schematic diagram for explaining that the x-axis energy-density distribution of a laser beam is asymmetric but the y-axis energy-density distribution of the laser beam is symmetric.

For example, let us consider the case that the energy density of a laser beam is distributed as illustrated in FIG. 12 by disposing a liquid crystal device shown in FIG. 4 in the path of the laser beam and controlling the meshes of the liquid crystal device. In FIG. 12, "B" designates the energy-density distribution of a laser beam 1 in the x-axis cross section thereof, and "C" designates the energy-density distribution of the laser beam 1 in the y-axis cross section thereof. As shown in the contour map of FIG. 12, the energy density of the laser beam 1 is controlled by the liquid crystal device so that the peak is placed at a position 29 which is disposed eccentrically to the center of the laser beam 1. Therefore, the energy-density distribution of the laser beam 1 is symmetric with respect to the y-axis, but is asymmetric with respect to the x-axis. When welding with the laser beam 1 exhibiting such an energy-density distribution, the linear parts of a weld line are scanned in the y-axis of the laser beam 1 so that the energy-density distribution of the laser beam 1 is symmetric in the widthwise direction of the weld line. However, the liquid crystal device is swung about the axial line of the laser beam 1 synchronously with the scanning of the curved parts of the weld line so as to irradiate the major-curvature-radius curved part with a higher energy-density side 30 of the laser beam 1.

In addition to the method which uses a liquid crystal device as the energy-density controlling means, it is possible to suitably apply the scanning with such a laser beam to the method which uses a rotary disk, and to the method which gives stress to an optical fiber.

Moreover, when using a laser beam exhibiting a deviated energy-density distribution, it is preferable as well to rotate the laser beam at a high revolving speed so as to equalize the energy-density distribution at the linear parts of a weld line; and to swing the laser beam about the axial line of the laser beam synchronously with the scanning of the curved parts of the weld line so as to always irradiate the major-curvature-radius curved part with a higher energy-density side of the laser beam as described above.

Figure 9:
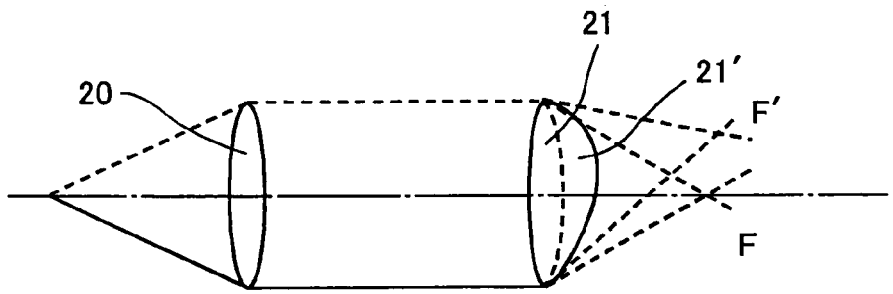
FIG. 9 is a schematic diagram for illustrating an example of how to control an energy density of a laser beam by a cylindrical lens.

When the liquid crystal device shown in FIG. 4 is used as the energy-density controlling means, it is possible to carry out the laser-beam scanning by swinging the liquid crystal device, which controls the energy density of a laser beam, about the axial center, or by swinging the meshes, which reduce the energy density of a laser beam, in the stationary liquid crystal device. Moreover, when the energy density of a laser beam is controlled by using the rotary disk shown in FIG. 6, it is possible to equalize the energy density of a laser beam, which has passed through the rotary disk, by rotating the rotary disk about the axial center while revolving the rotary disk about the axial line of the laser beam at a high revolving speed simultaneously. When a laser beam is emitted from YAG lasers or semiconductor lasers which use optical fibers for the laser-beam transmission system, it is possible to carry out the laser-beam scanning by twisting the optical fibers. That is, an optical fiber is swung reciprocally about the axial line by ±180 deg. or more when scanning the linear parts of a weld line with a laser beam, and is twisted synchronously with the scanning of the curved parts thereof with the laser beam. When the energy density of a laser beam is controlled by the focusing lens provided with an eccentric focus as shown in FIG. 9, it is advisable to rotate the focusing lens at a high revolving speed in scanning the linear parts of a weld line with a laser beam, and to swing the focusing lens synchronously with the scanning of the curved parts thereof so as to irradiate the major-curvature-radius with a higher energy-density side of the laser beam. In addition, when a polarization plate is disposed in the path of a laser beam whose energy density has been controlled already, it is possible to swing the polarization direction or power intensity of the laser beam by swinging the polarization plate.

(4) Irradiating Weld Line with Small-Diameter Laser Beam

Heretofore, the methods of welding the transparent resinous material to the absorptive resinous member by irradiating the weld line with a laser beam has been described, in methods which the weld line is irradiated with a laser beam whose diameter is equal to the width of the weld line. However, the following method is available in order to equalize the laser-beam energy density at the major-curvature-radius curved part of the weld line with the laser-beam energy density at the minor-curvature-radius curved part thereof. Specifically, the transparent resinous member can be welded to the absorptive resinous member uniformly over the entire width of the weld line by scanning the weld line with a laser beam whose spot diameter is reduced fully smaller than the width of the weld line.

Figure 13:
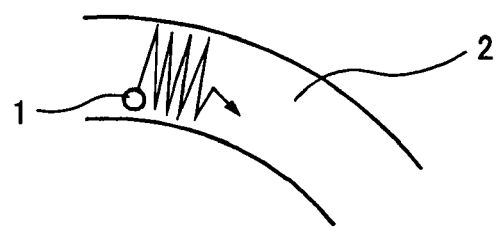
FIG. 13 is a schematic diagram for illustrating a welding process with a laser beam whose diameter is fully smaller than a strip-shaped width of a weld line, in welding process which the weld line is scanned by traversing the laser beam in a zigzag manner.
Figure 14:
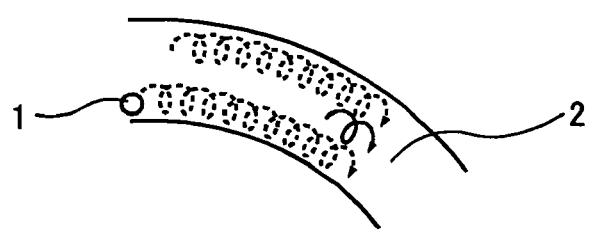
FIG. 14 is a schematic diagram for illustrating a welding process with a laser beam whose diameter is fully smaller than a strip-shaped width of a weld line, in welding process which the weld line is scanned by traversing the laser beam in a spiral manner.
Figure 15:
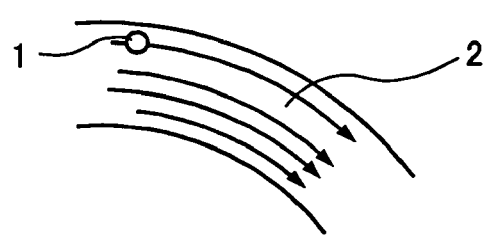
FIG. 15 is a schematic diagram for illustrating a welding process with a laser beam whose diameter is fully smaller than a strip-shaped width of a weld line, in welding process which the weld line is scanned by traversing the laser beam a plurality of times in an extending direction of the weld line.

FIG. 13 illustrates a scanning method in which a weld line 2 is scanned with a small-diameter laser beam 1 while traversing the small-diameter laser beam 1 in a vibrating manner in the widthwise direction of the weld line 2. FIG. 14 illustrates another scanning method in which a weld line 2 is scanned a plurality of times with a small-diameter laser beam 1 while traversing the small-diameter laser beam 1 in a spiral manner. Moreover, it is preferable to employ a still another method in which a weld line 2 is scanned a plurality of times with a small-diameter laser beam 1 while traversing the small-diameter laser beam 1 parallely to the weld line 2. The scanning method is not limited to the preferred embodiments exemplified above. Note that it is suitable that the diameter "D" of a small-diameter laser beam can fall in a range of from 0.3 (not inclusive) to 2 mm (not inclusive), i.e., 0.3<"D"<2 mm. When the diameter "D" is 0.3 mm or less, it is not preferable, because the weld between the transparent resinous member and the absorptive member might be deformed, or because it takes much longer to weld the entire width of the weld line so that the operation efficiency degrades. On the other hand, when the diameter "D" is 2 mm or more, it is not appropriate, because the advantage resulting from the small-diameter laser beam might be lost so that no uniform weld line might be produced. The diameter "D" of a small-diameter laser beam can further preferably fall in a range of from 0.6 (not inclusive) to 1 mm (not inclusive), i.e., 0.6<"D"<1 mm.

(5) Making Weld Line of Linear Parts Only

Figure 16:
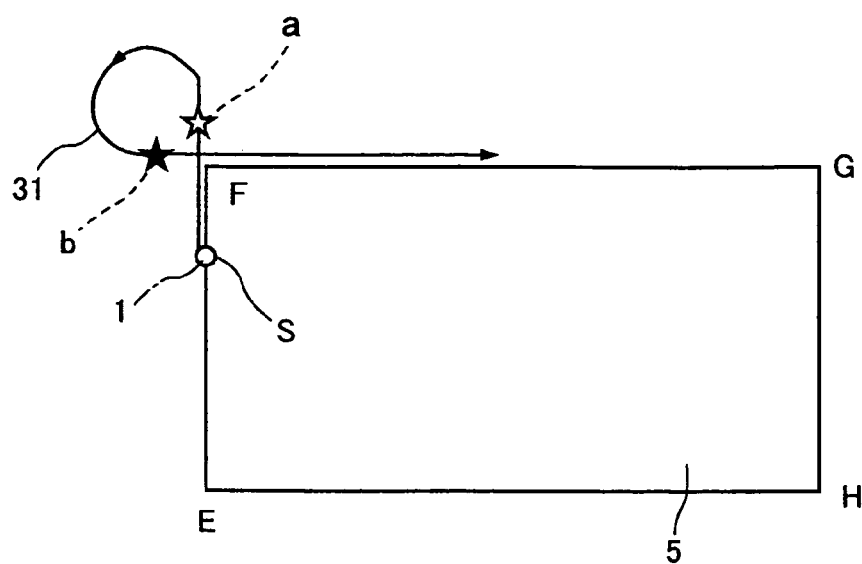
FIG. 16 is a schematic diagram for illustrating how to scan a weld line comprising linear parts only with a laser beam.
Figure 17:
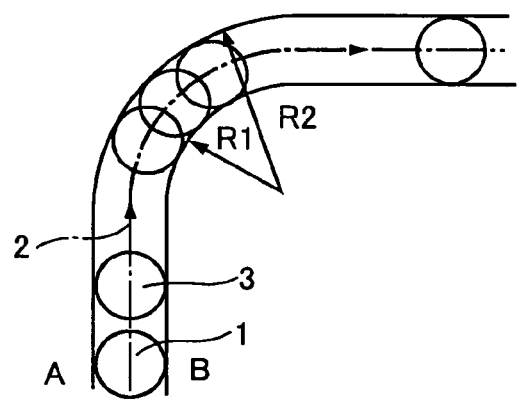
FIG. 17 is a schematic diagram for explaining the locus of a laser beam along the linear parts and curved parts of a weld line.
Figure 18:
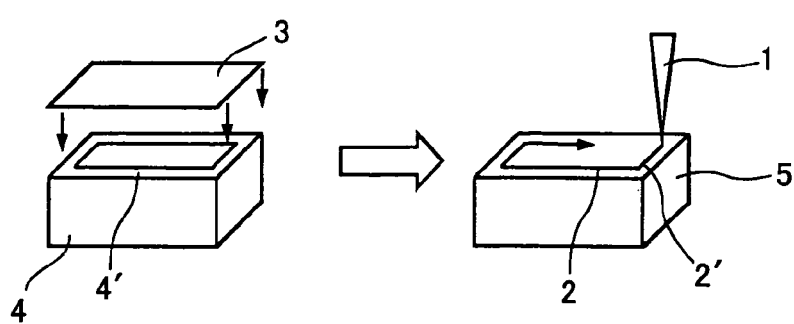
FIG. 18 is a schematic diagram for illustrating how to scan a weld line when welding a box-shaped absorptive-resinous member with a plate-shaped transparent-resinous member with a laser beam.

So far, welding processes for welded resinous products whose weld line comprises linear parts and curved parts have been described in detail. However, depending on jigs and the shape of resinous members to be welded, a weld line can be free from curved parts, and can be made of linear parts only. FIG. 16 is a schematic planar diagram for illustrating how to scan a weld line made of linear parts alone with a laser beam, and shows a traversing locus of the laser beam which scans and welds along a rectangular weld line "EFGH" of a resinous member 5 only linearly. A laser beam 1 is traversed along the weld line "EF" to scan it starting at a point "S," but is not turned at a corner "F" in the direction of the weld line "FG." Instead, the laser beam 1 is traversed in the direction of the extension of the weld line "EF," specifically, it is traversed excessively to scan upto the outside of the resinous member 5. Then, the laser beam 1 is turned around counterclockwise along a locus 31, and is traversed from the extension of a weld line "FG" to the weld line "FG" by way of the corner "F." In the welding method shown in FIG. 16, the emission of the laser beam 1 is turned off at a point "a" on the extension of the weld line "EF," and is turned on again at a point "b" on the extension of the weld line "FG." Accordingly, it is possible to make the weld line "EFGH" of linear parts alone without letting the laser beam 1 adversely affect the supporting jigs and supporting bench for the resinous member 5. Thus, when a weld line comprises linear parts only as described above, it is possible to alleviate the drawbacks resulting from the uneven weld strength.

Laser Welding Apparatus

The present laser welding apparatus comprises:
means for irradiating a transparent resinous member overlapped on an absorptive resinous member with a laser beam,
the transparent resinous member having a first predetermined shape, and comprising a part including a strip-shaped first weld surface, at least the part formed of a transparent resin allowing the laser beam to transmit therein,
the absorptive resinous member having a second predetermined shape, and comprising a part including a strip-shaped second weld surface to be welded to the first weld surface, at least the part formed of an absorptive resin which absorbs the laser beam;
whereby welding an interface between the first weld surface of the transparent resinous member and the second weld surface of the absorptive resinous member as a strip shape, the interface having a weld line welded as a strip shape and comprising linear parts neighboring with each other, a major-curvature-radius curved part intervening between the linear parts and a minor-curvature-radius curved part intervening between the linear parts; and
energy averaging means for averaging the energy of the laser beam acting on a side of the major-curvature-radius curved part and the energy of the laser beam acting on a side of the minor-curvature-radius curved part in the second weld surface of the absorptive resinous member.

In the present laser welding apparatus, the laser beam is not limited in particular. It is possible to use laser beams which have been used extensively for cutting or welding metals, or for photochemical reactions. For example, it is possible to use laser beams emitted from YAG lasers, semiconductor lasers, solid-state lasers, or gas lasers whose representative is carbon dioxide lasers.

Moreover, it is advisable to combine the present laser welding apparatus with industrial robots. With such a combination, it is possible to carry out such a control that the linear parts and curved parts are scanned while giving them an individually required energy only.

Laser-Welded Resinous Product

The present laser-welded resinous product comprises:
a transparent resinous member having a first predetermined shape, and comprising a part including a strip-shaped first weld surface, at least the part formed of a transparent resin allowing a laser beam to transmit therein;
an absorptive resinous member overlapped on the transparent resinous member, having a second predetermined shape, and comprising a part including a strip-shaped second weld surface to be welded to the first weld surface, at least the part formed of an absorptive resin which absorbs the laser beam;
the transparent resinous member and the absorptive resinous member being welded at an interface between the first weld surface of the transparent resinous member and the second weld surface of the absorptive resinous member as a strip shape by irradiating the transparent resinous member with the laser beam, the interface having a weld line welded as a strip shape and comprising linear parts neighboring with each other, a major-curvature-radius curved part intervening between the linear parts and a minor-curvature-radius curved part intervening between the linear parts; and exhibiting weld strength on a side of the major-curvature-radius curved part substantially equal to weld strength on a side of the minor-curvature-radius curved part.

In the present laser-welded resinous product, the resinous material for the transparent resinous member is not limited in particular as far as it exhibits thermoplasticity and allows laser beams, the heat source, to transmit therein by predetermined transmissivity or more. For instance, it is possible to name polyamides (PA) such as nylon 6 (PA6) and nylon 66 (PA66), polyethylene (PE), polypropylene (PP), styrene-acrylonitrile copolymers, polyethylene terephthalate (PET), polystyrene (PS), acrylonitrile-butadiene-styrene (ABS), polymethyl methacrylate (PMMA), polycarbonate (PC) and polybutylene terephthalate (PBT). Note that these resinous materials can be colored to use, if necessary.

Moreover, the resinous material for the absorptive resinous member is not limited in particular as far as it exhibits thermoplasticity, and does not allow laser beams, the heat source, to transmit therein but can absorb it. For example, it is possible to name those admixtures of polyamides (PA) such as nylon 6 (PA6) and nylon 66 (PA66), polyethylene (PE), polypropylene (PP), styrene-acrylonitrile copolymers, polyethylene terephthalate (PET), polystyrene (PS), acrylonitrile-butadiene-styrene (ABS), polymethyl methacrylate (PMMA), polycarbonate (PC), polybutylene terephthalate (PBT) and polyphenylene sulfide (PPS) with carbon black or an ordinary coloring agent such as dyes and pigments. In addition, the carbon black admixed with the resinous materials as a laser-energy adsorbent can desirably be admixed in an amount of more than 0.1% by weight with respect to the resinous materials. When the admixing amount of the carbon black is 0.1% by weight or less with respect to the resinous materials, the resulting admixtures cannot fully adsorb the energy of laser beams. On the other hand, when the carbon black is admixed in an amount of more than 2% by weight with respect to the resinous materials, it is not preferable because such an admixing amount results in blow holes or cavities. Note that the admixing amount can further preferably fall in a range of from 0.2 to 1% by weight with respect to the resinous materials.

The present laser-welded resinous product is produced by welding the transparent resinous member and absorptive resinous member, which are molded into a predetermined shape from the aforementioned resinous materials, with a laser beam, and the weld strength is uniform at the curved parts of the weld line. Hence, it can make welded products with high airtightness.

The present invention has been detailed so far with reference to the preferred embodiments. However, the present invention is not limited to such preferred embodiments at all. It is needless to say that the present invention can be performed in various modes, provided that they do not deviate from the subject of the present invention.

Having now fully described the present invention, it will be apparent to one of ordinary skill in the art that many changes and modifications can be made thereto without departing from the spirit or scope of the present invention as set forth herein including the appended claims.

What is claimed is:

1. A process for laser welding resinous members, the process comprising the steps of:

overlapping a transparent resinous member on an absorptive resinous member, the transparent resinous member having a first predetermined shape, and comprising a part including a strip-shaped first weld surface, at least the part being formed of a transparent resin allowing a laser beam to transmit therein, the absorptive resinous member having a second predetermined shape, and comprising a part including a strip-shaped second weld surface to be welded to the first weld surface, at least the part of the absorptive resinous member being formed of an absorptive resin which absorbs the laser beam; and irradiating the transparent resinous member with the laser beam, thereby welding an interface between the first weld surface of the transparent resinous member and the second weld surface of the absorptive resinous member as a strip shape, the interface having a weld line welded as a strip shape and comprising linear part neighboring with each other, a major-curvature-radius curved part intervening between the linear parts and a minor-curvature-radius curved part intervening between the linear parts, wherein an energy averaging device is configured to average the energy of the laser beam acting on a side of the major-curvature-radius curved part and the energy of the laser beam acting on a side of the minor-curvature-radius curved part in the second weld surface of the absorptive resinous member, wherein the energy averaging device is configured to let the laser beam traverse along a scanning line shifted on a side of the major-curvature-radius curved part with respect to the center line of a strip-shaped width of the weld line, wherein the energy averaging device is configured to let the laser beam exhibit a cross-sectional energy-density distribution which is axially symmetrical to a scanning direction of the laser beam at the linear parts of the weld line, and swings the laser beam about the axial line of the laser beam synchronously with the scanning with the laser beam at the major-curvature-radius curved part and minor-curvature-radius curved part of the weld line, thereby lowering an energy density at the minor-curvature-radius curved part than that at the major-curvature-radius curved part, and wherein the energy averaging device is configured to let the laser beam rotate about the axial line of the laser beam by rotating a cylindrical lens or a polarizing plate at the linear parts of the weld line, and lets the laser beam swing about the axial line of the laser beam by swinging the cylindrical lens or the polarization plate at the major-curvature-radius curved part and minor-curvature-radius curved part of the weld line.

2. A process for laser welding resinous members, the process comprising the steps of:

overlapping a transparent resinous member on an absorptive resinous member, the transparent resinous member having a first predetermined shape, and comprising a part including a strip-shaped first weld surface, at least the part being formed of a transparent resin allowing a laser beam to transmit therein, the absorptive resinous member having a second predetermined shape, and comprising a part including a strip-shaped second weld surface to be welded to the first weld surface, at least the part of the absorptive resinous member being formed of an absorptive resin which absorbs the laser beam; and irradiating the transparent resinous member with the laser beam, thereby welding an interface between the first weld surface of the transparent resinous member and the second weld surface of the absorptive resinous member as a strip shape, the interface having a weld line welded as a strip shape and comprising linear part neighboring with each other, a major-curvature-radius curved part intervening between the linear parts and a minor-curvature-radius curved part intervening between the linear parts, wherein an energy averaging device is configured to average the energy of the laser beam acting on a side of the major-curvature-radius curved part and the energy of the laser beam acting on a side of the minor-curvature-radius curved part in the second weld surface of the absorptive resinous member, wherein the energy averaging device is configured to let the laser beam traverse along a scanning line shifted on a side of the major-curvature-radius curved part with respect to the center line of a strip-shaped width of the weld line, and wherein the averaging device is configured to equalize an energy density of the laser beam at the linear parts of the weld line by rotating the laser beam about the axial line of the laser beam at a high revolving speed, and turns off the high-revolving-speed rotation of the laser beam temporarily at the major-curvature-radius curved part and minor-curvature-radius curved part of the weld line so as to swing the laser beam about the axial line of the laser beam synchronously with the scanning with the laser beam, thereby lowering an energy density at the minor-curvature-radius curved part than that at the major-curvature-radius curved part.

3. The process set forth in claim 2, wherein the energy averaging device is configured to let the laser beam rotate about the axial line of the laser beam by rotating a cylindrical lens or a polarization plate at the linear parts of the weld line, and the energy averaging device is configured to let the laser beam swing about the axial line of the laser beam by swinging the cylindrical lens or the polarization plate at the major-curvature-radius curved part and minor-curvature-radius curved part of the weld line.

* * * * *